United States Patent
David et al.

(10) Patent No.: US 7,650,049 B2
(45) Date of Patent: Jan. 19, 2010

(54) WAVEGUIDE MODULATOR AND RELATED MODULATION METHOD

(75) Inventors: Sylvain David, Courson-Monteloup (FR); Emmanuel Hadji, Fontaine (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 11/815,952

(22) PCT Filed: Feb. 9, 2006

(86) PCT No.: PCT/FR2006/002979

§ 371 (c)(1),
(2), (4) Date: Aug. 9, 2007

(87) PCT Pub. No.: WO2006/084999

PCT Pub. Date: Aug. 17, 2006

(65) Prior Publication Data

US 2008/0159682 A1   Jul. 3, 2008

(30) Foreign Application Priority Data

Feb. 11, 2005   (FR)   ................................. 05 01406

(51) Int. Cl.
*G02F 1/01*   (2006.01)
(52) U.S. Cl. ............................................. 385/1; 385/2

(58) Field of Classification Search ....................... None
See application file for complete search history.

(56) References Cited

U.S. PATENT DOCUMENTS

| | | | |
|---|---|---|---|
| 6,091,536 A * | 7/2000 | Usami et al. ................. | 359/244 |
| 6,529,646 B1 | 3/2003 | Wight et al. | |
| 2001/0006567 A1 | 7/2001 | Yokoyama et al. | |
| 2003/0161565 A1 | 8/2003 | Bastian | |
| 2004/0150873 A1 | 8/2004 | Pearsall | |
| 2005/0196101 A1 | 9/2005 | Hamann et al. | |

FOREIGN PATENT DOCUMENTS

| | | |
|---|---|---|
| EP | 0 964 305 A1 | 6/1998 |
| EP | 1 403 684 A1 | 3/2004 |

OTHER PUBLICATIONS

Chen et al., "Nonlinearity enhancement in finite coupled-resonator slow-light waveguides", Dept of Electrical and Computer Engineering, University of Utah, Optic Express, vol. 12, No. 15, pp. 3353-3366, Jul. 26, 2004, XP-002347624.

(Continued)

*Primary Examiner*—Sung H Pak
(74) *Attorney, Agent, or Firm*—Brinks Hofer Gilson & Lione

(57) ABSTRACT

A modulator including a waveguide propagating an electromagnetic wave of given wavelength ($\lambda$) with absorption. Means such as an electrical junction enable the residence time of the electromagnetic wave in the guide to be modified. A corresponding modulation method is also provided.

21 Claims, 1 Drawing Sheet

OTHER PUBLICATIONS

Fenigstein et al., "Current induced intersubband absorption in GaAs/GaAlAs quantum wells", American Institute of Physics, Appl. Phys. Lett. vol. 66, No. 19, pp. 2513-2515, May 8, 1995.

M. Elkurdi et al., "Electromodulation of the interband and intraband absorption of Ge/Si self-assembled islands", Elsevier, Physica E. 16, vol. 2, pp. 450-454, 2002.

Ku et al., "Slow light in semiconductor quantum wells", Optical Society of America, Dept of Electrical and Computer Science, University of California, Optical Society of America, vol. 29, No. 19, pp. 2291-2293, Oct. 1, 2004, XP-002347625.

Notomi et al, "2D SOI Photonic Crystal Slab and Line-defect Waveguide", NTT Telecommunications Energy Labs, pp. 574-575, XP-002347627.

Soljačić et al., "Photonic-crystal slow-light enhancement of nonlinear phase sensitivity", J. Opt. Soc. Am., vol. 19, No. 9, pp. 2052-2059, Sep. 2002.

PCT Written Opinion of the International Search Authority for International Application No. PCT/FR2006/000297.

* cited by examiner

PRIORITY CLAIM

This application is U.S. nationalization of PCT Application No. PCT/FR2006/000297, filed Feb. 9, 2006, and claims priority to French patent application No. 0501406, filed Feb. 11, 2005.

TECHNICAL FIELD

The invention concerns a modulator comprising a waveguide, for example an optical modulator, and a related modulation method.

BACKGROUND

Modulators are devices the object whereof is to control the transmission of a wave, for example the transmission of light in the case of optical modulators. This concept therefore covers devices that can vary the intensity of the wave transmitted continuously, or discontinuously, for example on an all or nothing basis in the case of switches.

At present the aim is to design modulators with a structure such that they can be integrated into components fabricated in silicon-based materials with a view to simplification of the fabrication of the whole and reduction of the size thereof.

In this context, it has already been proposed to modify the refractive index of a material by injection or depletion of charge carriers, for example as described in the document European Patent No. EP 1 403 684. Such modification of the index can lead to spectral displacement of a resonance of the waveguide or a shifting of the phase of the wave, which is then generally made to interfere with a wave that has not been phase-shifted (Mach-Zehnder device).

One such Mach-Zehnder device is described in U.S. Patent Application No. 2003/161565, for example, according to which the group velocity is caused to vary in one branch of the device in order to obtain a phase-shift of the signal in that branch relative to the signal that is traveling in the other branch of the device.

In both cases (displacement of a resonance or interference of phase-shifted waves), the resulting wave, and in particular its intensity, varies as a function of the density of the charge carriers, which can itself be controlled by an electrical voltage.

However, because of the physical phenomena utilized, modulation is obtained in these devices only over a narrow frequency band. Moreover, Mach-Zehnder devices have a relatively complex structure because they utilize two branches that must additionally be coupled to the main guide of the electromagnetic wave.

Modulating the absorption of a material so as to modulate directly the intensity of the wave that passes through it has also been proposed. For example, such solutions have been proposed in the papers "Current induced intersubband absorption in GaAs/GaAlAs quantum wells", A. Fenigstein et al., PPL. Phys. Lett. 66 (19), 8 May 1995, and "Electromodulation of the interband and intraband absorption of Ge/Si cells assembled islands", M. Elkurdi et al. Physica E16 (2003) 450/454.

However, the low absorption of silicon-based materials rules out the generation of high modulation of the intensity of the transmitted wave using known techniques, which therefore make the production of an efficient and compact modulator impossible.

SUMMARY

In order in particular to overcome these problems, the invention proposes a modulator comprising a waveguide propagating an electromagnetic wave of given wavelength with absorption, characterized by means adapted to modify the residence time of the electromagnetic wave in the guide.

The phenomenon of absorption of the electromagnetic wave can therefore be amplified by increasing the time for which it is resident in the guide to obtain by this means a relatively high resulting absorption, even if the intrinsic absorption of the material of the guide is relatively low.

The waveguide is produced in a material that is absorbent at the given wavelength, for example.

The waveguide can equally include nanostructures, for example, which can be quantum boxes or quantum wells of semiconductor material.

These two techniques, which may be compatible, produce a waveguide with a non-negligible intrinsic absorption, which can nevertheless be relatively low, as already indicated.

The waveguide can have a periodic variation of the dielectric permittivity, so benefiting from the physical properties of a dispersive structure, in particular from the existence of slow propagation modes at the limits or the center of the Brillouin zone.

In one possible embodiment, the waveguide is a photonic crystal guide. Such a guide can be produced by silicon-based methods, for example, which simplifies the integration of the modulator into a component.

It can equally be a guide of "rib" or "ridge" type the edges whereof have a sinusoidal shape.

The means adapted to modify the residence time can in practice comprise means adapted to modify the refractive index of the electromagnetic wave in the guide. This solution reduces the group velocity as a result of the index modification, and very much so in the case of the slow propagation modes referred to hereinabove.

In one possible embodiment, the means adapted to modify the refractive index can comprise an electrical junction. This solution is equally advantageous in terms of integration into a component.

The invention also proposes a method of modulation of an electromagnetic wave having a given wavelength and propagating in a waveguide with absorption, characterized in that it comprises a step of modification of the residence time of the electromagnetic wave in the guide.

The step of modification of the residence time is obtained by modification of the refractive index of the electromagnetic wave in the waveguide, for example.

Such a method can have the characteristics and the advantages already referred to hereinabove in relation to the modulator.

BRIEF DESCRIPTION OF DRAWING

Other characteristics and advantages of the present invention will become apparent in the light of the following description, given with reference to the appended drawings, in which.

DETAILED DESCRIPTION

Figure 1:
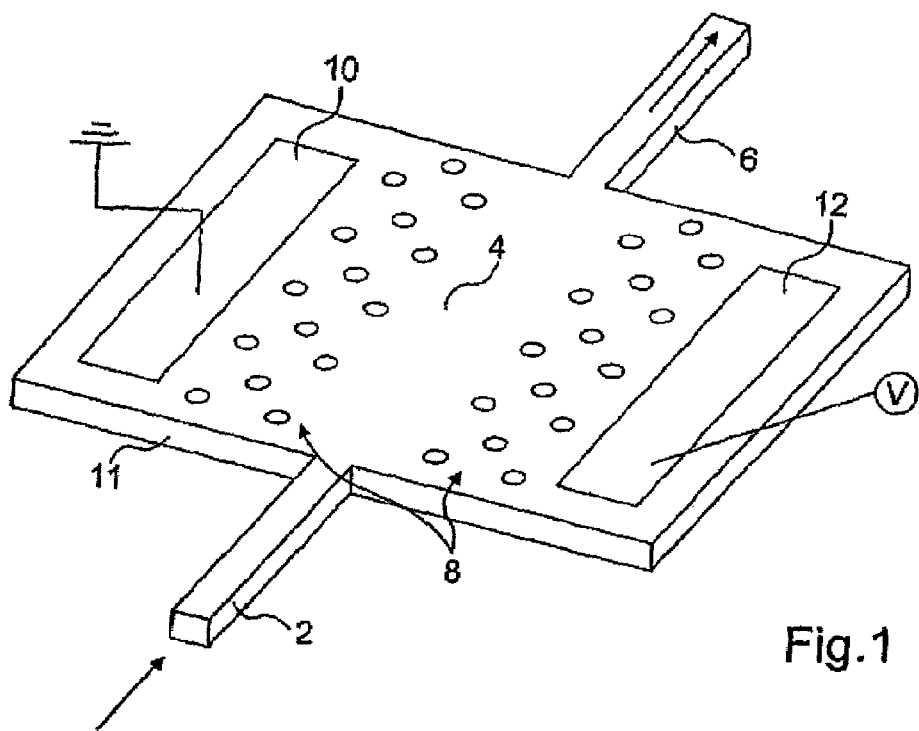
FIG. 1 represents a modulator produced in accordance with the teachings of the invention.

The modulator represented in FIG. 1 is an optical modulator that comprises an entry region 2, a waveguide (here an optical guide) 4, and an exit region 6.

The guide 4 is formed in a photonic crystal 8 (produced by periodic holes within a semiconductor material, for example) and therefore has a periodic variation of the dielectric permittivity.

The waveguide 4 includes nanostructures, for example germanium on silicon (Ge/Si) quantum boxes 5 (see FIG. 2), which absorb the electromagnetic wave to be transmitted. Alternatively, this absorption could be obtained by the choice of an absorbent material for producing the guide.

In the silicon technology, the intrinsic absorption of the materials is typically of the order of $1\ cm^{-1}$ to $10\ cm^{-1}$.

The photonic crystal 8 is placed within an electrical junction 11 to which an electrical voltage can be applied by means of two contacts 10, 12 situated on respective opposite sides of the photonic crystal 8.

Figure 2:
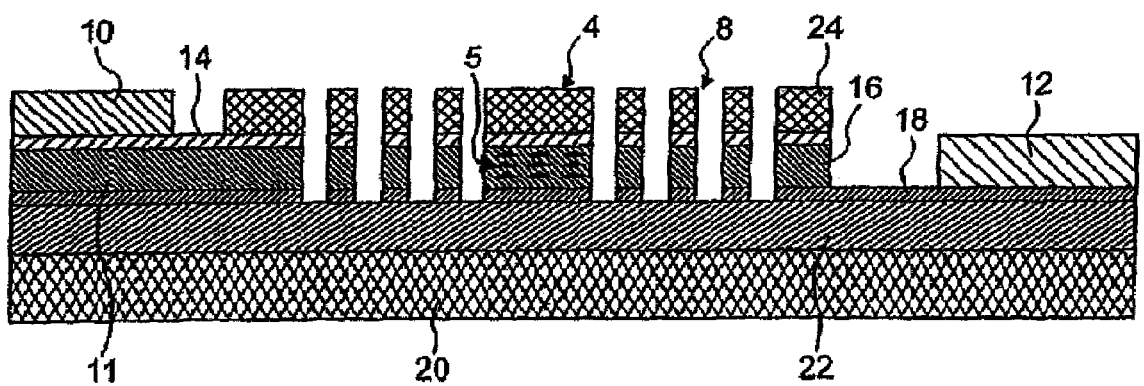
FIG. 2 represents a view in section of the modulator from FIG. 1.

FIG. 2 represents a view in section of the modulator that has just been described in which the structure of the electrical junction 11 is clearly apparent.

For example, the electrical junction 11 is deposited on a substrate 20 with an interposed layer of lower optical index than the material of the electrical junction, for example a layer 22 of oxide, in particular of silicon oxide. The electrical junction is formed of a first layer 18 produced in a doped semiconductor (here in Si-p) deposited on the oxide layer 22 and in electrical contact with the contact 12, a second layer produced in a semiconductor material (here in Si) deposited on the first layer 18, although without contact with the contact 12, and a doped semiconductor (here in Si-n) third layer 14 deposited on the second layer 16 without coming into contact with the contact 12 either. On the other hand, the contact 10 is deposited directly on the third layer 14, to join that layer to ground in the example represented in FIG. 1.

The third layer 14 may be covered by a second oxide layer 24.

As can be seen in FIG. 2, the first layer 18, the second layer 16 and the third layer 14 (and where applicable the second oxide layer 24) are crossed at regular intervals by openings that form the holes of the photonic crystal 8 already referred to.

Moreover, in the optical guide 4, the semiconductor material second layer 16 includes nanostructures (here quantum boxes 5) that generate absorption in the guide as already mentioned.

A quasi-monochromatic electromagnetic wave (for example light wave) of wavelength λ penetrates into the guide 4 via the entry region 2, is transmitted across the photonic crystal 8 by the guide 4, with absorption, and emerges from the photonic crystal 8 via the exit region 6.

Figure 3:
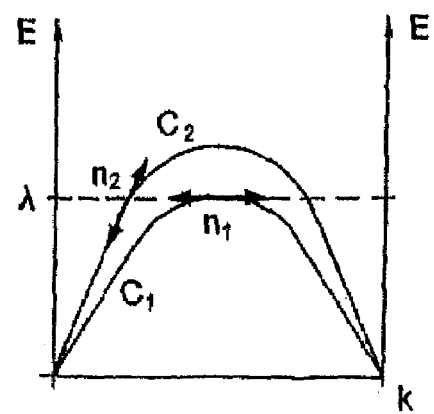
FIG. 3 shows dispersion curves illustrating the operation of the device from FIG. 1.

The electromagnetic wave propagates in the photonic crystal guide 4 with a group velocity determined by the slope at a point on a dispersion curve such as that represented in FIG. 3.

FIG. 3 illustrates the case where the depletion in charge carriers (obtained thanks to the electrical junction 11) of germanium on silicon quantum wells or boxes is used, which is relatively fast, in which case a portion of the dispersion curve is used with its concave side facing downward.

A curve portion with its concave side facing upward could nevertheless be used, depending on the material and the absorption process used.

The photonic crystal 8 being a dispersive structure, the dispersion curve of the waveguide 4 (which represents the energy as a function of the wave vector of the propagated mode) is not a straight line and therefore has a varying slope that is cancelled out at one point at least because of the presence of optical modes of the photonic crystal 8 coupled to each other by virtue of the periodic character of the dielectric constant of the photonic crystal 8 (i.e. by virtue of the energy band structure of the dispersion diagram).

By applying an electrical voltage within the junction 11 (by means of the contacts 10, 12 as represented diagrammatically in FIG. 1), the charge carrier population of the photonic crystal 8 can be varied and the energy of the dispersion curve of the guide 4 therefore shifted (i.e. by a vertical shift in FIG. 3), for example from the curve C2 to the curve C1 represented in FIG. 3.

This modifies the refractive index of the optical mode in the waveguide 4, which amounts to modifying the propagation velocity of the light for a given wavelength.

As shown in FIG. 3, shifting the energy of the dispersion curve can make the slope of this curve at the point corresponding to the wavelength λ concerned zero or virtually zero, without necessitating the application of a high voltage given the high curvature of the dispersion curve.

This phenomenon very significantly reduces (by a factor of 100) the group velocity of the wave propagated in the guide. In practice, the group velocity can in fact be reduced from c/3 to c/100 or even c/1000 (where c is the speed of light).

The very marked slowing of the light generated in this way produces a corresponding increase in the residence time of the electromagnetic wave in the guide, which leads to a very high increase of the absorption generated globally by the passage of the light through the waveguide 4.

The global absorption $\alpha_g$ is in fact linked to the intrinsic absorption $\alpha_i$ by the following equation, in which $v_g$ is the group velocity:

$$\alpha_g = \alpha_i.$$

This effect applies equally for wavelengths close to the wavelength λ, for which the slope of the dispersion curve is virtually zero and the group velocity greatly reduced.

In fact, as already mentioned, for a guide having a periodic variation of the dielectric permittivity, the variation of the residence time Δt in the guide is not proportional to the index variation Δn (as is the case in a rectilinear guide), but can increase even more, in accordance with the following mathematical relationships:

$$\Delta t \approx \Delta n \cdot \frac{\partial t}{\partial n} = \Delta n \cdot 1 \cdot \frac{\partial (1/v_g)}{\partial n}$$

where l is the length of the guide and $v_g$ is the group velocity, the term $$\frac{\partial (1/v_g)}{\partial n}$$

possibly becoming very large because of the periodic variation of the dielectric permittivity as already explained.

The structure shown in FIG. 1, which comprises only one waveguide, can thus be used as an optical modulator without necessitating the addition of a resonant structure or a parallel guide, as in Mach-Zehnder type devices, which prevents diffraction losses and widens the spectral range that can be used.

Note further that the modification of the density of the charge carriers in the junction 11 itself controls the absorption of that material, in particular in the guide 4, thanks to the quantum boxes 5.

The disposition of the guide 4 comprising the photonic crystal 8 in the junction 11 therefore combines the following two effects to modulate transmission by the guide if a voltage is applied to the junction:

modulation of the intrinsic absorption of the optical guide;
modulation of the propagation velocity of the guided optical mode in order to increase the residence time of the wave and thus to amplify the phenomenon of absorption by the guide.

The example given hereinabove naturally represents only one possible embodiment of the invention.

The invention claimed is:

1. A modulator comprising a waveguide including periodic holes and propagating an electromagnetic wave of given wavelength ($\lambda$) with absorption, and further comprising means adapted to vary an electrical charge population in quantum boxes included in the waveguide so as to modify the residence time of the electromagnetic wave in the waveguide.

2. The modulator according to claim 1, wherein the waveguide comprises a material that is absorbent at the given wavelength ($\lambda$).

3. The modulator according to claim 1, wherein the quantum boxes comprise nanostructures.

4. The modulator according to claim 3, wherein the nanostructures comprise a semiconductor.

5. The modulator according to any one of claim 1, wherein the waveguide comprises a structure having a periodic variation of the dielectric permittivity.

6. The modulator according to claim 5, wherein the waveguide comprises a photonic crystal.

7. The modulator according to claim 1, wherein the means adapted to modify the residence time comprise means adapted to modify the refractive index of the electromagnetic wave in the waveguide.

8. The modulator according to claim 7, wherein the means adapted to modify the refractive index comprises an electrical junction.

9. A method of modulating with a modulator including periodic holes, an electromagnetic wave having a given wavelength ($\lambda$) and propagating in a waveguide with absorption, the method comprising modifying the residence time of the electromagnetic wave in the waveguide by varying an electrical charge population within a quantum box in the waveguide.

10. The method according to claim 9, wherein modifying the residence time comprises modifying the refractive index of the electromagnetic wave in the waveguide.

11. A modulator comprising a waveguide configured to propagate an electromagnetic wave of given wavelength ($\lambda$) with absorption, the modulator comprising an electrical junction configured to modify the residence time of the electromagnetic wave by varying the electrical charge carrier population within photonic crystals in the waveguide, wherein the photonic crystals comprise quantum boxes that absorb the electromagnetic wave.

12. The modulator of claim 11, wherein the electrical junction comprises a first semiconductor layer doped to have a first conductivity type, a second semiconductor layer doped to have a second conductivity type, and an intermediate semiconductor layer between the first and second semiconductor layers.

13. The modulator according to claim 12, wherein the intermediate semiconductor layer further comprises the quantum boxes.

14. A modulator comprising:
a waveguide configured to propagate an electromagnetic wave of given wavelength ($\lambda$) with absorption; and
an electrical junction configured to modify the residence time of the electromagnetic wave by varying the electrical charge density within metallic nanostructures configured to absorb the electromagnetic wave in the waveguide,
wherein the electrical junction comprises a first semiconductor layer doped to have a first conductivity type, a second semiconductor layer doped to have a second conductivity type, and an intermediate semiconductor layer between the first and second semiconductor layers,
wherein the intermediate semiconductor layer further comprises the metallic nanostructures, and
wherein the metallic nanostructures comprise semiconductor quantum boxes.

15. The modulator according to claim 11 further comprising a substrate and a support layer having an optical index less than that of the electrical junction, and wherein the electrical junction overlies the support layer.

16. The modulator of claim 15 further comprising an oxide layer overlying the electrical junction.

17. The modulator of claim 16, wherein the oxide layer and the electrical junction include a plurality of openings therethrough exposing portions of the support layer and producing a periodic variation of the dielectric permittivity of the waveguide.

18. A modulator according to claim 1, wherein the waveguide is characterized by a dispersion curve having a varying slope, and wherein the electrical charge population shifts an energy level of the dispersion curve, such that the slope of the dispersion curve approaches approximately zero at the given wavelength.

19. The modulator according to claim 1, wherein the quantum boxes comprise metal regions within a semiconductor layer.

20. The modulator according to claim 19, wherein the metal regions comprise germanium, and wherein the semiconductor layer comprises silicon.

21. A modulator comprising a waveguide characterized by a dispersion curve having a varying slope wherein the waveguide propagates an electromagnetic wave of a given wavelength through quantum boxes that absorb the electromagnetic wave, and further comprising photonic crystals, wherein varying a charge carrier population in the photonic crystals modifies the residence time of the electromagnetic wave in the waveguide by shifting an energy level of the dispersion curve, such that a slope of the dispersion curve approaches approximately zero at the given wavelength.

* * * * *